United States Patent [19]

Everingham et al.

[11] 3,964,893

[45] June 22, 1976

[54] LAWN MOSS CONTROL WITH FERRIC AMMONIUM SULFATE-AMMONIUM SULFATE DOUBLE SALTS

[75] Inventors: John R. Everingham, San Rafael; Karl A. Hoenke, El Cerrito, both of Calif.

[73] Assignee: Chevron Research Company, San Francisco, Calif.

[22] Filed: Sept. 30, 1974

[21] Appl. No.: 510,676

[52] U.S. Cl. .................................. 71/65; 71/61; 71/63
[51] Int. Cl.$^2$ .................................. A01N 11/00
[58] Field of Search ............... 71/65, 63, 54, 61; 424/147; 423/351, 558, 545

[56] References Cited
UNITED STATES PATENTS

| | | | |
|---|---|---|---|
| 1,625,608 | 4/1927 | Holmes | 71/65 |
| 3,126,255 | 3/1964 | Cooke et al. | 423/545 |
| 3,168,437 | 2/1965 | Galloway | 71/DIG. 1 |
| 3,232,738 | 2/1966 | Bahme | 71/63 |
| 3,537,837 | 11/1970 | Mitsuya et al. | 71/65 |
| 3,585,022 | 6/1971 | Gray, Jr. | 71/DIG. 1 |
| 3,657,446 | 4/1972 | Blackmore | 71/DIG. 1 |

OTHER PUBLICATIONS

Blandy, "The Control of Mosses in Lawns, etc.," (1954) J. Sci. Food Agr. 5 pp. 397–400 (1954).
Minskii et al. "Double Salt $(NH_4)_2$ $SO_4$ $FeSO_4$ $6H_2O$ (1962) CA 58 pp. 6478–6479 (1963).

*Primary Examiner*—Glennon H. Hollrah
*Attorney, Agent, or Firm*—G. F. Magdeburger; D. A. Newell; Raymond Owyang

[57] ABSTRACT

Lawn moss is controlled with an herbicidally effective amount of granular ferric ammonium sulfate-ammonium sulfate double salts of the empirical formula $(NH_4)_3Fe(SO_4)_3 \cdot xH_2O$ wherein $x$ is 0 to 12. The double salts also provide excellent greening of the treated lawn.

5 Claims, No Drawings

LAWN MOSS CONTROL WITH FERRIC AMMONIUM SULFATE-AMMONIUM SULFATE DOUBLE SALTS

BACKGROUND OF THE INVENTION

Due to the well-established superiority of the ferrous form of iron over ferric iron for plant nutrition, ferrous forms of iron, e.g., ferrous ammonium sulfate, are commercially used for plant nutrition. However, because of low cost of many ferric salts, it would be advantageous to develop a ferric form of iron suitable for plant nutrition.

DESCRIPTION OF THE INVENTION

It has now been found that ferric ammonium sulfate-ammonium sulfate double salts of the empirical formula $(NH_4)_3Fe(SO_4)_3 \cdot xH_2O$ wherein $x$ is 0 to 12 are effective for the control of lawn moss in turf. Additionally, the double salts are as effective as ferrous salts, e.g., ferrous ammonium sulfate, for promoting greening and correction of iron deficiency in turf grass.

Generally, for the control of lawn moss, the double salt is applied in granular form or in aqueous solution to turf grass infested with lawn moss at a rate of about 0.3 to 1 pound Fe per 1000 ft$^2$ of lawn turf, although a rate of about 0.4 to 0.7 pound Fe per 1000 ft$^2$ of lawn turf is preferred. Preferably the double salt is applied to turf grass in granular form.

The double salt can be used alone for the control of lawn moss. However, it is generally desirable to apply the double salt in combination with plant nutrient additives, such as ammonium sulfate, in order to provide balanced moss control and plant nutrition. Generally, the double salt compositions will comprise about 20 to 80% by weight, based on total weight composition, of the double salt admixed with other plant nutrient additives. A preferred composition comprises about 20 to 80%, more preferably 60 to 80%, by weight of double salt and 20 to 80%, more preferably 20 to 40%, by weight of ammonium sulfate.

In addition to the plant nutrient additives, the double salt composition may also contain other pesticides, soil conditioners, and the like.

The granular ferric ammonium sulfate-ammonium sulfate double salt can be prepared by granulating a solution or slurry of substantially equimolar amounts of ferric ammonium sulfate and ammonium sulfate in water in conventional granulating equipment, such as spherodizers or rotary drum granulators, or in fluid bed granulators. Alternatively, the double salt can be prepared by granulating aqueous solutions or slurries of ferric sulfate and ammonium sulfate. The double salt may also be prepared from ferrous sulfate or ferrous ammonium sulfate, provided that the ferrous iron is oxidized to ferric iron during the granulation process, e.g., by air oxidation at elevated temperatures during the granulation process.

By any procedure of preparation, the granular double salts or compositions thereof are preferably Tyler mesh size −8+32, although Tyler mesh size −12+16 is also satisfactory. The pH of the double salt granules is generally about 1 to 6, although a pH of about 2 to 4 is preferred.

EXAMPLE 1 — Preparation of $(NH_4)_3Fe(SO_4)_3$ from ferric ammonium sulfate and ammonium sulfate A solution of 78.4 parts by weight ferric ammonium sulfate hydrate $[NH_4Fe(SO_4)_2 \cdot 12H_2O]$ and 55.3 parts by weight ammonium sulfate in hot water was granulated in a fluid-bed granulator. The granulator was operated at an inlet air temperature of 350°–450°F and an outlet air temperature of 170°–250°F. The product was screened to granules of Tyler mesh size −12+16.

The specific iron species in the product were determined with a Phillips x-ray diffraction instrument using copper radiation and a Guinier camera. Resultant patterns were compared with entries in the ASTM standard patterns index. The product analysis is tabulated in Table I.

EXAMPLE 2 — Preparation of $(NH_4)_3Fe(SO_4)_3$ from ferric sulfate and ammonium sulfate A solution of 39.1 parts by weight ferric sulfate nonahydrate and 58.5 parts ammonium sulfate in hot water were granulated in a fluid-bed granulator as described in Example 1. The product analysis is tabulated in Table I.

EXAMPLE 3 — Preparation of $(NH_4)_3Fe(SO_4)_3$ from ferrous sulfate, sulfuric acid and ammonia Ammonium sulfate was prepared by neutralizing 69.3 parts by weight of concentrated sulfuric acid with 17.9 parts by weight of gaseous ammonia to a pH of 3 to 3.5 in water. Ferrous sulfate monohydrate (27.7 parts by weight) was then added to the ammonium sulfate solution, and the resulting slurry was granulated in a conventional spherodizer operated at an inlet air temperature of 350°–450°F and an outlet air temperature of 170°–250°F. The product was circulated through a rotary drum drier with a hot-air stream for air oxidation of the ferrous iron to ferric iron. The inlet air temperature in the drier was 400°F and the product residence time was 60–90 minutes. The product was screened to granules of Tyler mesh size of −12+16. The product analysis is tabulated in Table I.

EXAMPLE 4 — Preparation of granulated ferrous ammonium sulfate

A solution of 63.0 parts by weight of ferrous ammonium sulfate and 48.6 parts by weight of ammonium sulfate was granulated in a fluid-bed granulator as described in Example 1. The product analysis is tabulated in Table I.

EXAMPLE 5 — Moss control and greening response in turf with $(NH_4)_3Fe(SO_4)_3$ Ferric ammonium sulfate-ammonium sulfate double salts were tested for the control of lawn moss and greening response in turf by the following procedure: Granules of the test composition were applied to a mixed Bentgrass (*Agrostis tenuis*)/Bluegrass (*Poa pratensis*) lawn infested with dense lawn moss (genus *Selaginella*) at an application rate of 1 pound nitrogen per 1000 ft$^2$ and 0.63 pound Fe per 1000 ft$^2$. Four applications of each test composition were applied to 5×5 feet, plots of lawn. The lawn plots were watered regularly after application. The treated lawn plots were inspected and the moss control and greening response rated on a scale of 0 to 10, where 0 represents no moss control or greening response and 10 represents 100% moss control or maximum greening response. The results are tabulated in Table II. For comparison, the ferrous ammonium sulfate composition of Example 4 was also tested.

TABLE I

| Example No. | pH | $(NH_4)_2SO_4$ | $(NH_4)_3Fe(SO_4)_3 \cdot xH_2O$ | Product Analysis $(NH_4)_2Fe(SO_4)_2 \cdot 6H_2O$ / $(NH_4)_2Fe_2(SO_4)_3$ | $H_2O$ |
|---|---|---|---|---|---|
| 1 | 2.2 | 35.3 | 63.3 | 1.4 | — |
| 2 | 1.9 | 24.9 | 70.4 | — | 4.7 |
| 3 | 3.3 | 52.0 | 22.7 | 19.9 | 5.4 |
| 4 | 3.4 | 47.9 | 1.4 | 50.7 | — |

TABLE II

| Example No. | Ferric Ammonium Sulfate Double Salt | Ferrous Ammonium Sulfate | Avg. Moss Control Rating 37 days | 59 days | 87 days | Avg. Greening Response 37 days | 59 days | 87 days |
|---|---|---|---|---|---|---|---|---|
| 1 | 63.3% | 1.4% | 8 | 7 | 6 | 8 | 7 | 7 |
| 3 | 22.7% | 19.9% | 7 | 6 | 6 | 8 | 8 | 7 |
| 4 | 1.4% | 50.7% | 6 | 6 | 5 | 8 | 8 | 7 |
| — | None (Check) | None (Check) | 1 | 1 | 1 | 6 | 6 | 6 |

What is claimed is:

1. A method for the control of lawn moss in turf grass which comprises applying to said lawn moss ferric ammonium sulfate-ammonium sulfate double salt of the empirical formula $(NH_4)_3Fe(SO_4)_3 \cdot xH_2O$ wherein $x$ is 0 to 12 at a rate of about 0.3 to 1 pound Fe per 1000 ft$^2$ of lawn turf.

2. The method of claim 1 wherein the double salt is applied at a rate of 0.4 to 0.7 pound Fe per 1000 ft$^2$ of turf.

3. The method of claim 1 wherein $x$ is zero.

4. The method of claim 1 wherein the double salt is applied in granular form.

5. The method of claim 1 wherein the double-salt pH is 2 to 4.